Figure 1:
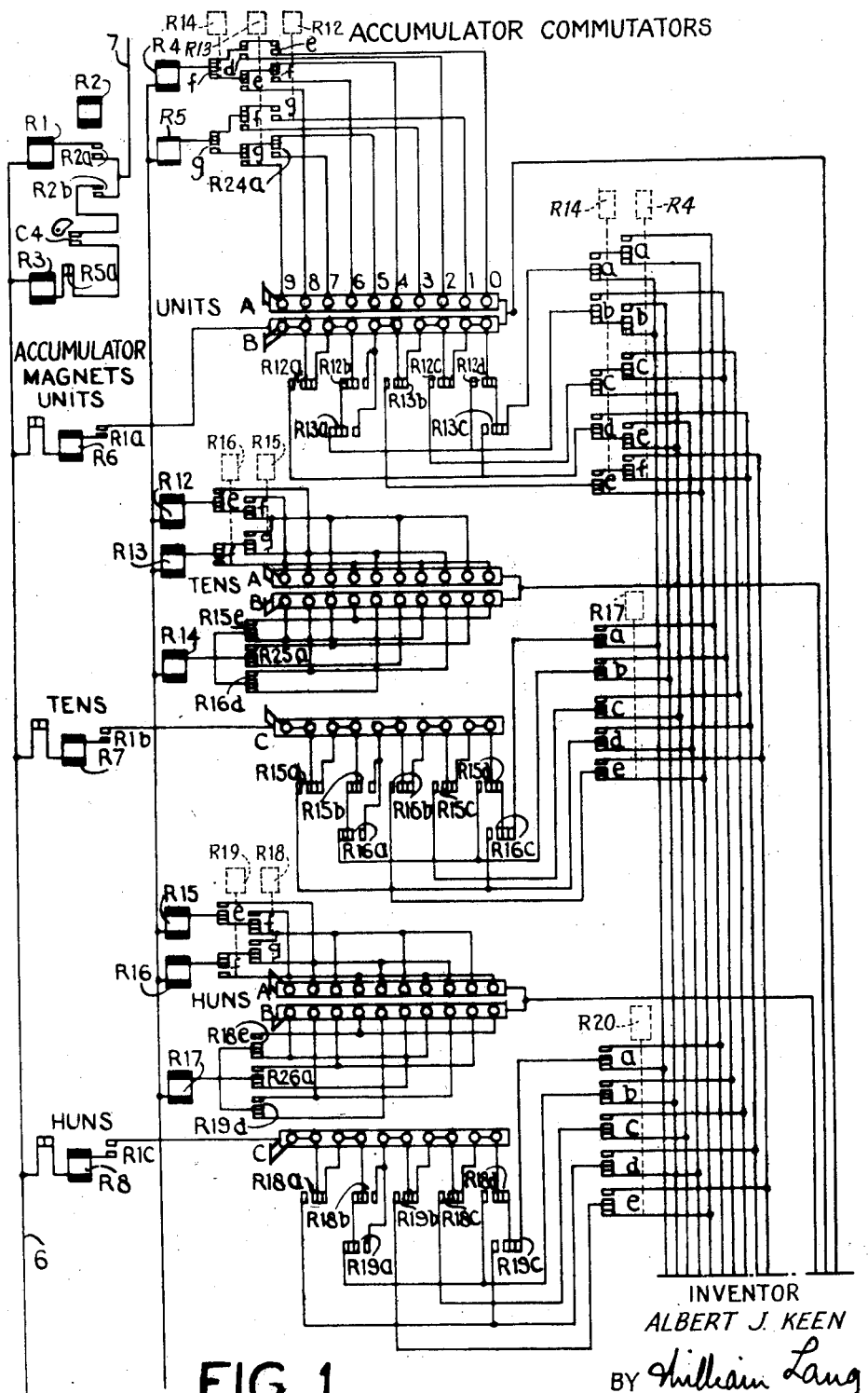

Dec. 9, 1952            A. J. KEEN            2,620,976

MECHANISM FOR CONVERTING PENCE AMOUNTS TO STERLING

Filed Oct. 4, 1950

INVENTOR
ALBERT J. KEEN
BY William Lang
ATTORNEY

Dec. 9, 1952             A. J. KEEN            2,620,976

MECHANISM FOR CONVERTING PENCE AMOUNTS TO STERLING

Filed Oct. 4, 1950            3 Sheets-Sheet 2

INVENTOR
ALBERT J. KEEN

BY William Lang
ATTORNEY

Patented Dec. 9, 1952

2,620,976

UNITED STATES PATENT OFFICE 2,620,976

MECHANISM FOR CONVERTING PENCE AMOUNTS TO STERLING

Albert J. Keen, Letchworth, England, assignor to International Business Machines Corporation, New York, N. Y., a corporation of New York Application October 4, 1950, Serial No. 188,431
In Great Britain October 12, 1949

10 Claims. (Cl. 235—61.6)

This invention relates to means for translating amounts expressed in pence into the equivalent sterling amount and it is more particularly directed to such translating means suitable for use with record card controlled multiplying and dividing machines.

Record card controlled machines operating in the decimal notation may be utilized for problems involving a sterling multiplicand by first converting the sterling value to pence. When the calculation has been completed, it is necessary to re-convert the answer from pence to sterling. It will be appreciated that if part of the equipment already available in the decimal multiplier may be used in the reconversion, the cost and complexity of the extra equipment required to enable the decimal multiplier to deal with sterling will be appreciably reduced.

Accordingly, it is an object of the present invention to provide translating means to enable a product or quotient expressed in pence, calculated by a record card controlled multiplying or dividing machine, to be converted to the equivalent sterling value.

According to the invention, a device for translating a value in pence expressed in decimal notation in an accumulator into sterling notation comprises an accumulator having read out commutators and electrical circuit dividing networks whereby one sixth the value registered on the accumulator, neglecting any remainder, may be combined with the said value so that the said accumulator registers the five sixths value correctly in the tens and higher denominations, and also a further dividing network whereby half the said five sixths value as registered in the hundreds and higher denominations may be read out as the units and higher denominations of pounds respectively.

Other objects of the invention will be pointed out in the following description and claims and illustrated in the accompanying drawings, which disclose, by way of examples, the principle of the invention and the best mode, which has been contemplated, of applying that principle.

Figure 1A:
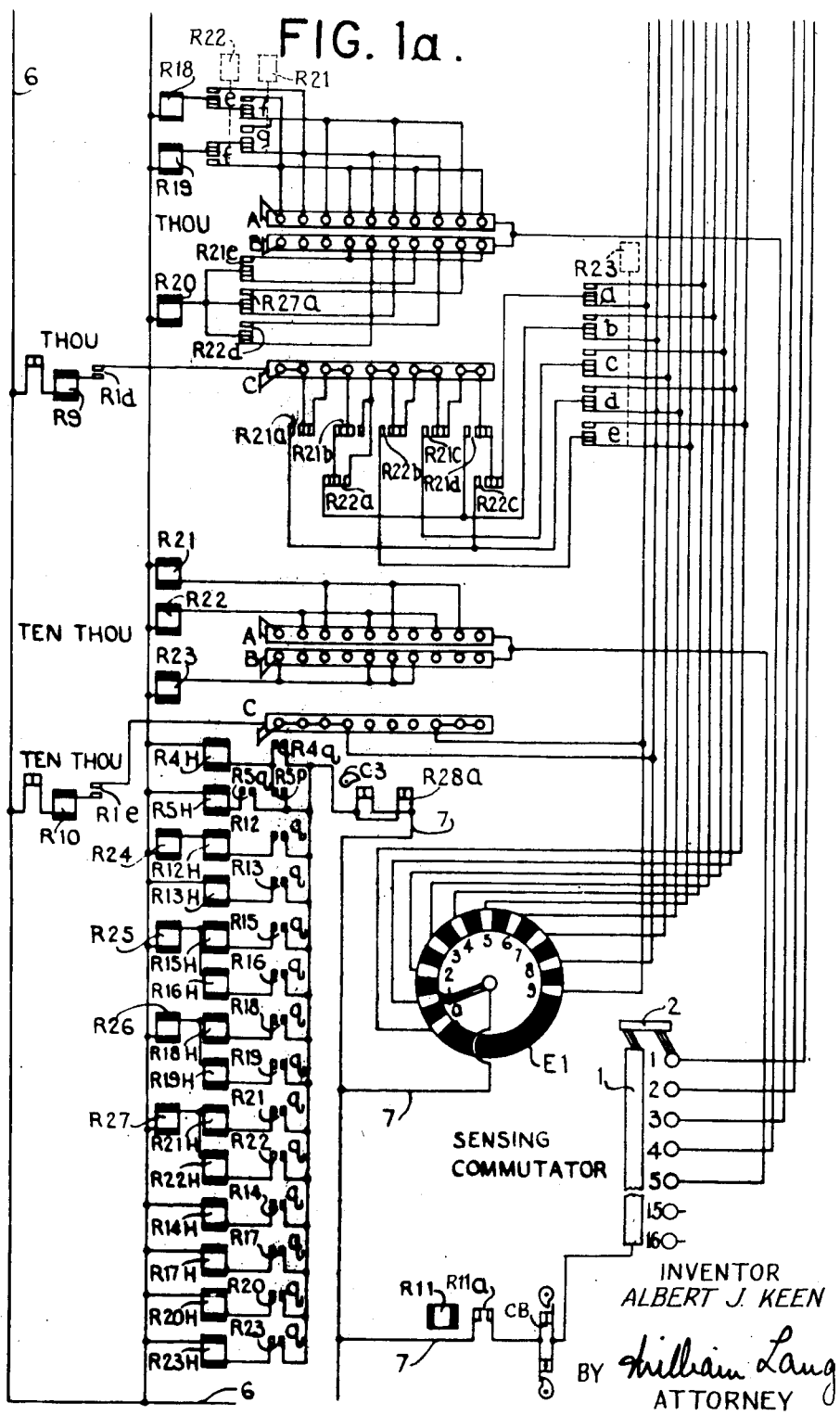
Figure 1B:
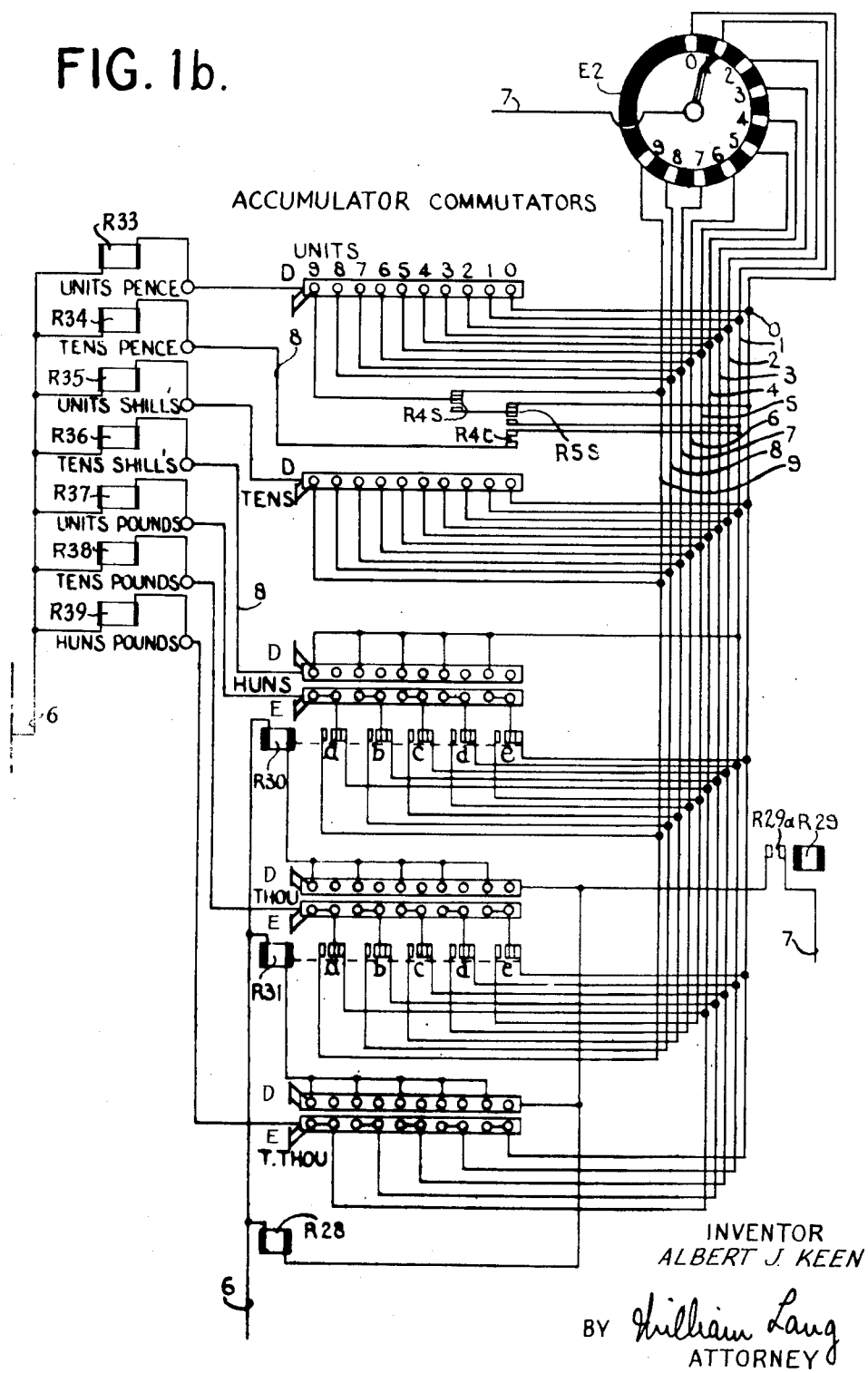

In the drawings:

Figs. 1, 1a and 1b placed one beneath the other comprise a circuit diagram of the preferred form of translator.

It will be appreciated that the translating means of the invention may be used in conjunction with various types of record card controlled multiplying and dividing machines; however, by way of example, it will be described as applied to a machine of the type disclosed in the patent to J. W. Bryce et al., No. 2,328,610 dated September 7, 1943.

The translation of a pence value to sterling may be considered as consisting of three stages:

(1). Division by 240 to obtain a whole number of pounds, (2). Division of the remainder of (1) by 12 to obtain a whole number of shillings, (3). The remainder from (2) comprises the number of pence.

This direct method of translation is not easily effected on a multiplier of the type shown in the reference patent and accordingly the method is modified in the following manner.

(1). Divide the pence amount $p$ by six to form a whole number quotient and a remainder $r$.

(2). Subtract the quotient $$\frac{p}{6}$$

from $p$ to form $$\left(p - \frac{p}{6}\right)$$

(3). Divide the hundreds and higher denominations of $$\left(p - \frac{p}{6}\right)$$

by two and column shift the resulting quotient downwards two places to give the whole number of pounds and a remainder $s$.

The result of these three operations is to effect a division by 240 as is shown by the identities:

$$\frac{p}{240} = \frac{5p}{6} \times \frac{1}{200} = \frac{1}{200}\left(p - \frac{p}{6}\right)$$

Due to neglecting the remainder $r$ the value of $$\left(p - \frac{p}{6}\right)$$

may be in error by an amount not greater than five and this is insufficient to cause an error in either the pounds or shillings values.

If the hundreds digit of the value $$\left(p - \frac{p}{6}\right)$$

is odd, then the final sterling value must contain a shillings term of ten or greater and accordingly any odd number in the hundreds denomination controls the reading out of one in the tens of shillings denomination.

The remainder $s$ comprises the tens and units digits of the value $$\left(p - \frac{p}{6}\right) \text{ or } \frac{5p}{6}$$

so that if this remainder is divided by ten, the whole number resulting will be one twelfth of the original pence value registered in the units and tens denominations. Thus the digit registered in the tens denomination of $$\frac{5p}{6}$$

may be read out directly as the units of shillings digit.

To obtain the pence value of the sterling result it is necessary to take into account the remainder $r$ and whether the units digit of $$\frac{p}{6}$$

is odd or even. The first case is when the quotient has an even units digit and $r$ is 5 or less. If six is divided into any number which gives an even quotient less than 10 and no remainder, then the quotient digit and the units digit of the dividend are the same.

$$0 \div 6 = 0$$
$$12 \div 6 = 2$$
$$24 \div 6 = 4$$
$$36 \div 6 = 6$$
$$48 \div 6 = 8$$

Thus when the one sixth quotient is subtracted from the dividend the units figure of the result will be zero. Similarly if the remainder is other than zero, then the units figure of the result will be the same as the remainder. For example:

$$13 \div 6 = 2 + 1 \text{ reminder}$$
$$13 - \frac{13}{6} = 1\underline{1}$$
$$39 \div 6 = 6 + 3 \text{ reminder}$$
$$39 - \frac{39}{6} = 3\underline{3}$$
$$53 \div 6 = 8 + 5 \text{ reminder}$$
$$53 - \frac{53}{6} = 4\underline{5}$$

From this it will be seen that in this case the units digit registered after operation (2) is the correct pence value and may be read out directly.

The second case arises when the units figure of the quotient is odd and the remainder $r$ is 0, 1, 2 or 3.

$$6 \div 6 = 1$$
$$18 \div 6 = 3$$
$$30 \div 6 = 5$$
$$42 \div 6 = 7$$
$$54 \div 6 = 9$$

In this case if the quotient digit is subtracted from the dividend the units digit of the result is one less than the correct pence value. Accordingly an odd quotients digit is decreased by one before subtracting the quotient digit from the dividend. For example:

$$18 \text{ pence} = 1\text{s. } 6\text{d.}$$
$$18 \div 6 = 3$$
$$18 - \left(\frac{18}{6} - 1\right) = 1\underline{6}$$
$$45 \text{ pence} = 3\text{s. } 9\text{d.}$$
$$45 \div 6 = 7$$
$$45 - \left(\frac{45}{6} - 1\right) = 3\underline{9}$$

The third case arises when the units digit of the quotient is odd and the remainder $r$ is 4 or 5. The pence value will then be tenpence or elevenpence and since the accumulator is operating in decimal, special provision has to be made for reading out these values. When there is an odd units digit and the remainder is 4, a relay is operated to record this fact and to control the reading out of tenpence, and if the remainder is 5, a second relay is operated which controls the reading out of elevenpence.

Certain of the contacts of these relays are so connected in the dividing circuit that, whether the remainder be four or five, the units digit resulting after subtraction is 9. To effect this, when the original value is such as to give a final read out of tenpence, the contacts of the first relay suppress the subtraction of one from the quotient and when the read out is elevenpence, the second relay is also operated and serves to suppress the "elusive one" carry which arises during subtraction by complemental addition and thus, in effect, increases the quotient value by one.

It will be assumed that at the end of the multiplying or other calculation the result in pence is contained in a single accumulator which may well be the usual products accumulator. The accumulator is shown as consisting of five denominations, and may be of the type shown in the reference patent. Each denomination is provided with five readout commutators of the type shown in the reference patent, which are referenced A, B, C, D and E. However, in the units denomination commutators C and E are not used and in the tens denomination commutator E is not used. Therefore these commutators are not shown in the drawings.

The common bars of the accumulator commutators A and B for each denomination are connected to a corresponding segment of the sensing commutator (Fig. 1a). The brush 2 of this commutator successively connects the segments to the common bar 1, commencing with segment 16, the commutator brush being secured to a shaft which is driven from the main driving shaft of the machine through suitable gearing. Thus the A and B accumulator commutators of each denomination are connected to the common bar 1 each denomination successively commencing with the highest denomination.

By way of example it will be assumed that the pence value standing on the accumulator at the commencement of the conversion operation is 16307.

At the beginning of the first machine cycle of conversion, the relay R11 (Fig. 1a) is energized. This may be effected, for example, by the closure of cam contacts operated by a cam shaft driven by the machine or by a similar means which is operated when the multiplication is completed. The closure of contacts R11a connects the common bar 1 of the sensing commutator to line 7 through the circuit breakers CB and contacts R11a.

After the energization of relay R11 the brush 2 of the sensing commutator commences to move successively over the segments 16, 15, 14 etc. of the commutator. When the brush 2 reaches segment 5 a circuit is completed as follows: line 7 (Fig. 1a), contacts R11a (closed), circuit breakers CB, common bar 1, brush 2, segment 5, commutator common bar A of the ten thousands denomination, segment 1, relay R21 to line 6, lines 6 and 7 being the two main supply lines, thus energizing relay R21 and also relay R27 via contacts R21q. The common bar of commutator A will be connected to segment 1 since the value 1 is registered in this particular denomination.

As the sensing commutator brush 2 moves successively over the remaining segments further circuits will be made from line 7 in similar manner.

(1). From segment 4, commutator common bar A of the thousands denomination segment 6, *f* contacts of relay R21 (shifted), *e* contacts of relay R22 (normal), relay R18 to line 6, thus energizing relay R18 and also relay R26 via contacts R18q.

(2). From segment 4, commutator common bar B of the thousands denomination, segment 6, *e* contacts of relay R21 (shifted), relay R20 to line 6, thus energizing relay R20.

(3). From segment 3, commutator common bar A of the hundreds denomination (Fig. 1) segment 3, *f* contacts of relay R18 (shifted), *e* contacts of relay R19 (normal), relay R15 to line 6, thus energizing relay R15 and also relay R25 (Fig. 1a) via contacts R15q.

(4). From segment 2, commutator common bar A of the tens denomination, segment 0, *f* contacts of relay R15 (shifted), *e* contacts of relay R16 (normal), relay R12 to line 6, thus energizing relay R12 and also relay R24 (Fig. 1a) through contacts R12q.

(5). From segment 2, commutator common bar B of the tens denomination, segment 0, *e* contacts of relay R15 (shifted), relay R14 to line 6, thus energizing relay R14.

(6). From segment 1, commutator common bar A of the units denomination, 7 segment, contacts R24a (shifted), *g* contacts of relay R13 (normal), *g* contacts of relay R14 (shifted), relay R5 to line 6, thus energizing relay R5.

Thus, at the end of the sensing commutator movement, the following relays have been energized: R21, R18, R20, R15, R12, R14 and R5. These relays close their related *q* contacts (Fig. 1a) to energize the holding coils R21H, R18H, etc. In addition, the relays R27, R26, R25 and R24 are energized being in series with R21, R18, R15 and R12, respectively. The hold circuits run in parallel from line 7 through cam contacts C3 which are closed during the whole of the translating operation, and relay contacts R28a in parallel, the closed *q* contacts, relay coils to line 6. A further circuit is made from line 7 through cam contacts C3, contacts R5p (shifted), relay coil R4H to line 6, to energize relay R4.

The circuits now set up by the combination of the accumulator commutator settings and the shifted relay contacts described in the preceding paragraph allow the reading out of the quotient of 16307 divided by 6 on the second conversion cycle in complement form to effect the required subtraction. The complementary number is read into the accumulator by the circuits described hereinafter for the second conversion cycle.

At the beginning of the second cycle, relay R11 is deenergized by the opening of cam contacts (not shown) and relay R2 (Fig. 1) is energized by the closure of cam contacts (not shown). Through contacts R2a (shifted), a circuit is made to energize relay R1 which shifts the related contacts R1a to R1e.

In Fig. 1a is shown an emitter E1, well known in the art, which provides impulses at digital times on the related lines. At "9" time, a circuit will be made as follows: from line 7 (Fig. 1a), brush of emitter E1, segment 9, segment 1 of commutator C of the tens thousands denomination, common bar. contacts R1e (shifted) (Fig. 1), accumulator magnet R10 of the ten thousands denomination to line 6.

Further circuits at the corresponding digit times will be made:

(1). From emitter segment 7, contacts R23c (normal) (Fig. 1a), contacts R21c (shifted), contacts R22b (normal), contacts R21b (shifted), segment 6 of commutator C of the thousands denomination, common bar of commutator C, contacts R1d (shifted), accumulator magnet R9 to line 6.

(2). From emitter segment 2, *c* contacts of relay R20 (shifted) (Fig. 1), contacts R18c (shifted), segment 3 of commutator C of the hundreds denomination, common bar of commutator C, contacts R1c (shifted), accumulator magnet R8 to line 6.

(3). From emitter segment 8, *b* contacts of relay R17 (normal) (Fig. 1), contacts R15d (shifted), segment 0 of commutator C of the tens denomination, common bar of commutator C, contacts R1b (shifted), accumulator magnet R7 to line 6.

(4). From emitter segment 2, contacts R4c (shifted) (Fig. 1), *c* contacts of relay R14 (shifted), contacts R12c (shifted), contacts R13b (normal), contacts R12b (shifted), segment 7 of commutator B of the units denomination, contacts R1a (shifted), accumulator magnet R6 to line 6.

It was previously noted that two relays are provided for controlling the pence readout when this is tenpence or elevenpence. The first of these relays is relay R4, which increases the quotient digit by one when the *a* to *f* contacts of relay R4 are shifted. For example, the connection from the 7 segment of commutator B of the units denomination is made to emitter line 3 when relay R4 is not energized and to line 2 when relay R4 is energized. The circuit is traced from the 7 segment of commutator B, through contacts R12b (shifted), contacts R13b (normal), contacts R12c (shifted) to the shifted *c* contacts of R14. When relay R4 is not energized, the circuit is completed to emitter line 3. When relay R4 is energized and the *c* contacts of R4 are shifted, the circuit is completed to emitter line 2. Since this readout is in complement the true units digit would be 6 with relay R4 not energized and 7 when relay R4 is energized. The second relay is relay R5 and this, when energized, breaks the circuit for entry of the "elusive one" by opening contacts R5a. Normally, when cam contacts C4 close momentarily at the end of the accumulator entry cycle, a circuit is made through contacts R5a to energize the carry magnet R3 of the units denomination and thus cause an additional entry of one.

In the present example, the complemental value read into the accumulator by the accumulator magnets being energized at appropriate digital times through the circuit network just described, is 97282. This is the complement to 9 of 2717, which is the quotient of 16307 divided by six. Thus the quotient is odd, but since the remainder is five, both relays R4 and R5 are energized and the complement of the true value of the quotient is subtracted from the original value with the "elusive one" carry suppressed. The result registered in the accumulator is therefore 13589 and not 13590 as would have been the case if the carry had not been suppressed.

At the beginning of the third conversion cycle, due to the action of the related cam contacts (not shown), relay R2 is deenergized and relay R29 (Fig. 1b) is energized. Contacts R29a close and set up a series of circuits from line 7 via contacts R29a:

(1). To relay R28 and line 6. The energization of relay R28 opens contacts R28a (Fig. 1a) and places the circuit to the holding coils R4H, R15H, R12H, etc. under control of the cam contacts C3. These contacts break at the end of the third conversion cycle and thus deenergize all the aforementioned relays.

(2). To common bar of commutator D of the ten thousands denomination, segment 1, relay R31 to line 6, thus energizing relay R31.

(3). To common bar of commutator D of the thousands denomination, segment 3, relay R30 to line 6, thus energizing relay R30.

After the relays R30 and R31 have closed their related contacts, a series of digitally timed impulses are supplied by the emitter E2 to selectively energize the readout lines 8 to represent the sterling amount of the translated pence value, the brush of the emitter being secured to a shaft driven from the machine drive shaft through suitable gearing. From line 7, the brush of emitter E2 and the noted segments, the following circuits are made:

(1). At "6" time, to contacts R31d (shifted), segment 3 of commutator E of the thousands denomination, common bar, to line 8 tens of pounds.

(2). At "7" time, to c contacts of relay R30 (shifted), segment 5 of the commutator E of the hundreds denomination, common bar to line 8 units of pounds.

(3). At "1" time, to segment 5 of the commutator D of the hundreds denomination, common bar to line 8 tens of shillings.

(4). At "8" time, to segment 8 of commutator D of the tens denomination, common bar to line 8 units of shillings.

(5). At "1" time, to contacts R4t (shifted) to line 8 tens of pence.

(6). At "1" time, to contacts R5s (shifted), contacts R4s (shifted), segment 9 of commutator D of the units denomination, common bar to line 8 units of pence.

(7). At "0" time, to segment 1 of the commutator E of the ten thousands denomination, common bar to line 8 hundreds of pounds.

Thus the value £67: 18: 11d. which is the sterling equivalent of 16307 pence, has been read out on the lines 8 by digitally timed impulses selected by the circuits described. This readout may be employed to enter the value in a second accumulator, control the type selecting mechanism of a print unit, or otherwise effect a registration, in well known manner. For the purposes of this invention a result device is shown in Fig. 1b for receiving the sterling value. The result device includes a relay for each denomination of the sterling value. These relays are designated R-33, R-34, R-35, R-36, R-37, R38 and R39 in Fig. 1b.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cyclically operable machine, an accumulator arranged for additive or subtractive operations having denominationally ordered elements, each element having a plurality of readout devices, means for entering a pence value in the units and higher orders of the accumulator, a dividing circuit, operable during one cycle for subtractively entering in the accumulator the nines complement of one sixth the pence value registered on the accumulator neglecting any remainder, a result device including a plurality of denominationally ordered control elements, column shift devices and control means effective during the following cycle for effecting a readout of half the value registered in the hundreds and higher orders through said column shift devices to the elements of the result device whereby the value standing in the hundreds and higher orders will be read out as the nearest units and higher denominations of pounds.

2. In a machine of the class described, a device settable to represent an amount, an impulse emitter for emitting a single series of electrical impulses, one impulse for each of the digits 1 to 9, a cyclically operable accumulator responsive to electrical impulses, said emitter being arranged to emit a single series of impulses for one cycle of operation of the accumulator, readout devices, circuit connections between the emitter and the accumulator extending through said readout devices, means for readjusting the circuit connections and effective during said cycle of the accumulator for selecting from said single series of impulses, impulses representative of five-sixths the amount standing in the accumulator, a result device, column shift devices, other readout devices, and means controlled by the other readout devices on the following cycle through said column shift devices for making a direct entry in the result device.

3. In a machine of the class described, a device settable to represent an amount, an impulse emitter for emitting a single series of electrical impulses, one impulse for each of the digits 1 to 9, a cyclically operable accumulator responsive to electrical impulses, said emitter being arranged to emit a single series of impulses for one cycle of operation of the accumulator, readout devices, circuit connections between the emitter and the accumulator extending through said readout devices, means for readjusting the circuit connections and effective during said cycle of the accumulator for selecting from said single series of impulses, impulses representative of five-sixths the amount standing in the accumulator, a result device, other readout devices, another impulse emitter for emitting another single series of electrical impulses, circuit connections between the emitter and the accumulator extending through said other readout devices, means for altering the circuit connections and effective on the following cycle for selecting from the second single series of impulses, impulses representative of the sterling equivalent of the amount originally entered in the accumulator, column shift means for shifting the denominational allocation thereof and means for making a direct entry of the sterling amount in said result device.

4. The device of claim 1, including means for reading out a "1" in the tens of shillings denomination when the digit in the hundreds denomination of the five sixths value is odd.

5. The device of claim 4, including means for reading out the digit standing in the tens denomination of said five sixths value as the units of shillings value.

6. The device of claim 5, including means for reading out the units digit of said five sixths value as the pence value when the one sixths value is even.

7. The device of claim 1, including means operable on the first cycle for decreasing the units digit of the one sixth value by one so as to increase the units digit of the five sixths value by one when the units digit of said one sixth value is odd, means responsive to the occurrence of a neglected remainder of four or five to prevent a decreasing of the units digit, and means for reading out the units digit of the corrected five sixths value as the pence value.

8. The device of claim 7, including means effective on the first cycle for controlling the entering of a "9" in the units order of the accumulator when the units digit of said one sixth value is odd and the neglected remainder is a four or five, and for controlling the correcting of the "9" readout to "10" or "11" when the neglected remainder is four or five respectively.

9. The device of claim 8, wherein the latter control means includes a pair of relays, the first of which effects an altering of the dividing circuit in a manner whereby the complement to "9" of the actual value of the one sixths value is registered in the accumulator.

10. The device of claim 9, wherein the second relay effects an altering of the dividing circuit in a manner whereby the entry of the "elusive one" is suppressed when the neglected remainder is five.

ALBERT J. KEEN.

REFERENCES CITED

The following references are of record in the file of this patent:

UNITED STATES PATENTS

| Number | Name | Date |
| --- | --- | --- |
| 1,877,801 | Britten | Sept. 20, 1932 |
| 2,066,764 | Campbell | Jan. 5, 1937 |
| 2,113,612 | Campbell | Apr. 12, 1938 |
| 2,126,615 | Campbell | Aug. 9, 1938 |
| 2,399,755 | Mills et al. | May 7, 1946 |